US011261994B2

(12) United States Patent
Kogure

(10) Patent No.: US 11,261,994 B2
(45) Date of Patent: Mar. 1, 2022

(54) ONE-TOUCH LOCK VALVE AND RAW MATERIAL CONTAINER

(71) Applicant: Kitz SCT Corporation, Tokyo (JP)

(72) Inventor: Yusaku Kogure, Gunma (JP)

(73) Assignee: KITZ SCT CORPORATION, Tokyo (JP)

(*) Notice: Subject to any disclaimer, the term of this patent is extended or adjusted under 35 U.S.C. 154(b) by 33 days.

(21) Appl. No.: 16/620,979

(22) PCT Filed: Jun. 12, 2018

(86) PCT No.: PCT/JP2018/022464
§ 371 (c)(1),
(2) Date: Dec. 10, 2019

(87) PCT Pub. No.: WO2019/064720
PCT Pub. Date: Apr. 4, 2019

(65) Prior Publication Data
US 2020/0173577 A1 Jun. 4, 2020

(30) Foreign Application Priority Data
Sep. 26, 2017 (JP) .............................. JP2017-184389

(51) Int. Cl.
F16K 35/02 (2006.01)
F16K 31/60 (2006.01)

(52) U.S. Cl.
CPC ............ F16K 35/025 (2013.01); F16K 31/60 (2013.01)

(58) Field of Classification Search
CPC ........ F16K 31/60; F16K 35/025; F16K 35/02; F16K 35/022; F16K 35/10
(Continued)

(56) References Cited

U.S. PATENT DOCUMENTS 7,131,629 B2 * 11/2006 Iwabuchi ................ B60T 17/04
251/63.5
8,814,137 B2 * 8/2014 Wong ........................ F16K 5/06
251/149.9
(Continued)

FOREIGN PATENT DOCUMENTS

| JP | 59-85476 | 6/1984 |
| JP | 6-7244 | 2/1994 |

(Continued)

OTHER PUBLICATIONS

International Search Report dated Sep. 4, 2018 in International (PCT) Application No. PCT/JP2018/022464.

Primary Examiner — Kevin F Murphy
Assistant Examiner — Jonathan J Waddy
(74) Attorney, Agent, or Firm — Wenderoth, Lind & Ponack, L.L.P

(57) ABSTRACT

A one-touch valve including a valve main body (1) having a valve body incorporated therein, a stem (3) mounted on the valve main body, a rotating handle (6) fixedly attached to an upper part of the stem, a holder (21) accommodated in the rotating handle, and a lock mechanism (10) arranged in the holder and the rotating handle. The lock mechanism is formed of a spring inserted into the holder, a spherical body provided on a lower spring-back side of the spring, a lock member having a midway on a rear end side axially attached to the holder, having a rear end part pressed by spring-back via the spherical body, and having a tip part side abutting on a lower edge part of the rotating handle in a spring-back state, and an engagement groove where the tip end part side of the lock member is locked by the rotating handle.

20 Claims, 8 Drawing Sheets

(58) Field of Classification Search
USPC ............... 251/111, 113, 114, 115, 116, 109
See application file for complete search history.

(56) References Cited

U.S. PATENT DOCUMENTS

| | | | |
|---|---|---|---|
| 2005/0199292 A1* | 9/2005 | Stedman | F16K 35/025 137/553 |
| 2010/0218830 A1* | 9/2010 | Yoon | F16K 35/06 137/385 |
| 2016/0356394 A1* | 12/2016 | Iizuka | F16K 7/16 |

FOREIGN PATENT DOCUMENTS

| | | |
|---|---|---|
| JP | 4021721 | 12/2007 |
| JP | 2017-116073 | 6/2017 |
| WO | 2005/088180 | 9/2005 |
| WO | 2015-129174 | 9/2015 |

\* cited by examiner

ONE-TOUCH LOCK VALVE AND RAW MATERIAL CONTAINER

BACKGROUND OF THE INVENTION

1. Technical Field

The present invention relates to one-touch lock valves and raw material containers capable of opening and closing, for example, a flow path of a process fluid for use in semiconductor manufacturing, and for locking with one touch.

2. Description of the Related Art

Conventionally, as a process fluid for use in semiconductor manufacture, a material for gasification made of a liquid or solid is used. This process fluid often has very hazardous properties such as toxicity and flammability. Thus, a raw material container for delivering and storing that raw material is required to be strictly sealed so as not to leak the raw material to the outside. On the other hand, to let the process fluid flow from the inside of the raw material container to the outside, it is also required to make the inside communicate with an outer flow path. From this, normally, a valve is provided at an upper surface side of the raw material container, and this valve is generally provided with a manual handle for opening/closing operation. By this manual handle, the raw material container is set to be operable to a valve-close state at the time of non-use such as delivery or storage. On the other hand, when the raw material in the container is used, the raw material container is set to be connected to a supply line and then be operable to a valve-open state.

As a raw material container of this type, for example, an airtight container with a liquid supply structure is disclosed in Japanese Patent No. 4021721. To this airtight container, a plurality of valves are attached to a lid side. By manually operating these valves to switch flow paths, a fluid is suppled to and emitted from the inside of the container. When the valves are operated to be closed, the inside is hermetically sealed to allow the container main body to be attached to or detached from a system.

In this case, it is dangerous if the handle is loosened by an inadvertent external force such as vibration, impact, and others at the time of delivery of the raw material container or the like. Moreover, if the handle is rotated by an unintentional operation such as erroneous operation after the raw material container is connected to a raw material supply line or the like, the process fluid may be leaked, possibly leading to a disaster. To prevent these, some of these valves may be configured to be able to be locked in a valve-close state. As a lock mechanism for this, for example, a cover may be attached to the handle, or locking is made with a padlock. The handle is prevented from being loosened when not necessary by an inadvertent external force, unintentional operation, or the like.

Also, a rotating-handle cap is disclosed in WO 2015/129174. This cap is attached from above a rotating handle of a valve, and is rotated integrally with the handle via a clutch part with asperities or is caused to rotate with respect to the handle, thereby preventing erroneous operation of the rotating handle.

In a valve disclosed in Japanese Patent Application Laid-Open No. 2017-116073, a position restriction mechanism is provided to a handle for valve operation. This position restriction mechanism has a position restriction member and an elastic-force providing member formed of a spring which provides an elastic force to the position restriction member. By the elastic force of the spring, the position restriction member is positionally restricted. On the other hand, when the position restriction member is firmly held against the elastic force of the spring, position restriction can be released. Thus, when no external force (firmly-holding force) is applied to the position restriction member, rotation of the handle is restricted with respect to a valve box part, and the handle can be operated to rotate in a state in which an external force by firm holding is applied.

SUMMARY OF THE INVENTION

1. Technical Problem

In the lock mechanism of the valve handle described above, when the cover is attached to the handle, the cover is separately required, and also attachment and detachment thereof is cumbersome.

On the other hand, when locking is made by using a padlock, in addition to an increase in the number of components due to this padlock, a locking piece of hardware is required to be attached for locking with the padlock. In this case, a space for installing the locking piece of hardware is required around the valve. At the time of locking, the work is complex, and usability is degraded. After locking, management of a key is also required, thereby also posing a problem of poor workability.

The cap of WO 2015/129174 is required to be newly attached from above the rotating handle to prevent erroneous operation of the valve. In this case, the cap is attached to an outer surface side, thereby leading to an increase in the size of the valve as a whole. Moreover, attachment may not be allowed if a plurality of valves is integrated on an upper surface of a raw material container. Still further, since the cap is a component separate from a valve, the number of components is increased.

In the position restriction mechanism in the valve of Japanese Patent Application Laid-Open No. 2017-116073, when the handle is rotated from a position restricted state, the handle is required to be operated to rotate while a force is applied to the position restriction member in a releasing direction against a biasing force of the spring, and this makes unlocking troublesome. In this case, in addition to a force in a rotating direction of the handle, an extra force to release the position restriction member is also required. Moreover, the handle cannot be operated unless the forces are applied until the position restriction part of the position restriction member is completely unlocked.

During operation of the rotating handle, the force of the spring in the spring-back direction is continuously applied to the position restriction member. Thus, a strong operation force against the spring force is required, and the position restriction mechanism is also subject to significant wear. From these, operability of the handle is degraded.

The present invention was developed to solve the above-described problems, and has an object of providing a one-touch lock valve, which is a valve that automatically locks a rotating handle to prevent opening/closing operation when not necessary, unlocks with one touch while maintaining compactness as a whole by a simple inner mechanism, and can be operated with excellent operability.

2. Solution to the Problem

To achieve the above-described object, the invention is directed to a one-touch lock valve comprising: a valve main body having a valve body incorporated therein; a stem axially mounted on the valve main body; a rotating handle fixedly attached to an upper part of the stem; a holder accommodated inside the rotating handle and fixed to an axial mounting part of the valve main body; and a lock mechanism arranged in the holder and the rotating handle. The lock mechanism is formed of a spring inserted into the holder, a spherical body provided on a lower side of the spring, a lock member having a rear end side axially attached to the holder, a rear end part pressed by the spring via the spherical body, and a tip part side abutting on a lower edge part of the rotating handle, and an engagement groove where the tip end part side of the lock member is locked by the rotating handle and, in a state in which the lock member is at a position opposed to the engagement groove, an automatic lock is made in a state in which the lock member is pressed by the spring force into the engagement groove.

Another aspect of the invention is directed to the one-touch lock valve, in which the spherical body is pressed by the spring via a spring receiver attached below the spring, the lock member is pressed by the spring toward the lower edge part of the rotating handle in a state in which a hemispherical part formed at a rear end part of the lock member is engaged via the spherical body, and a tip of the lock member is caused to protrude to some extent from a side of the rotating handle.

Another aspect of the invention is directed to the one-touch lock valve, in which the lock member is locked in the engagement groove at a valve-close position of the rotating handle.

Another aspect of the invention is directed to the one-touch lock valve, in which a display part for full-open and full-close is provided on an upper surface of the holder, and the display part is provided so as to be visually recognizable from a visual recognition window provided on the rotating handle.

Another aspect of the invention is directed to the one-touch lock valve, in which a check rod is provided to extend to an upper side of the spring receiver, and a through hole is provided as a bore in the display part of the holder so that an upper end of the check rod can move up to an exposed state.

Another aspect of the invention is directed to the one-touch lock valve, in which the upper end of the check rod is exposed in the display part to allow an unlocked state or a locked state of the rotating handle to be visually recognized from outside.

Another aspect of the invention is directed to the one-touch lock valve, in which a collar is attached to the lock member at a position to be in contact with the lower edge part of the rotating handle.

Another aspect of the invention is directed to a raw material container to which a manual valve is attached, the manual valve being equipped with the lock mechanism in which the rotating handle can be locked at the valve close position.

3. Advantageous Effects of the Invention

The lock mechanism is arranged in the holder and the rotating handle, and the lock mechanism is formed of the spring inserted into the holder, the spherical body provided on the lower side of the spring, the lock member on the rear end side axially attached to the holder and having the rear end part pressed by the spring via the spherical body, having the tip part side abutting on the rotating handle, and the engagement groove where the tip end part side of the lock member is locked and, in a state in which the lock member is at a position opposed to the engagement groove, an automatic lock is made in a state in which the lock member is pressed by the spring into the engagement groove, thereby reliably preventing opening/closing operations of the rotating handle when subject to inadvertent external forces or unintentional operation. In this case, compactness as a whole is maintained by the simple inner mechanism having the lock member and the engagement groove without externally and separately providing a component for locking, and the valve can be used in a narrow place. At the time of operation, as the lock member is removed from the engagement groove, the rotating handle is rotated, thereby allowing unlocking with one touch by a light force. After unlocking, in a state in which the lock member is removed from the engagement groove, the rotating handle can be rotated while the lower edge part of the rotating handle is in contact with the lock member, thereby allowing operation by a light operation force to any opening/closing position or intermediate degree of opening. At the time of unlocking or during rotating operation, a large load is not applied to each component, and thus each component is prevented from wearing out and excellent operability is maintained.

Further, the spherical body is pressed by the spring via the spring receiver attached below the spring, the lock member is pressed by the spring toward the lower edge part of the rotating handle in the state in which the hemispherical part formed at the rear end part of the lock member is engaged via the spherical body, and the tip of the lock member is caused to protrude to some extent from the a side of the rotating handle. Thus, the force of the spring can be transmitted from the lock member to a rotating handle by using leverage. With this, at the time of unlocking, the lock member can be operated with ease by a small force and at a small rotation angle. At the time of operation of the rotating handle, an influence of the force of the spring on the operation of the rotating handle is reduced to allow rotating operation by a small force, and the rotating handle rotates so as to slide over the outer peripheral surface of the lock member, thereby decreasing sliding resistance to reduce wear of the components. Furthermore, the lock member can be operated with ease by a user's finger.

Further, at the valve-close position of the rotating handle, this fully-closed state can be automatically locked. Furthermore, even when each product has an error in process accuracy of internal components or an internal component is loosened due to repetitive rotating operation or the like to change the valve-close position of the rotating handle, the relation between the lock member and the engagement groove can be finely adjusted in accordance with the rotating state of the rotating handle in the valve-close state, and an automatic lock can be reliably made at the valve-close position of the rotating handle.

Further, the display part for full-open and full-close can be visually recognized from the visual recognition window, and valve-closing operation can be performed while a state of becoming automatically locked is checked from this display part. Also, by finely adjusting the degree of valve-opening while visually recognizing the display part, adjustment can be made to a desired degree of valve-opening.

Further, the check rod moves up and down by operation of the lock member and, by visually recognizing the exposed state of the upper end of this check rod via the through hole of the display part of the holder, the operation state of the lock member can be checked from above the valve main body.

Further, since the unlocked state or the locked state of the rotating handle can be visually recognized from outside from the exposed state of the upper end of the check rod from the display part, erroneous operation of the lock member and a lock-incomplete state can be reliably prevented.

Further, the collar makes contact with the lower end edge of the rotating handle. With the collar rotating in accordance with the movement of the lower edge part of the rotating handle or sliding with respect to the rotating handle, contact resistance is decreased, and the rotating handle can be operated with a light force. With the collar in contact with the handle, the handle can be prevented from wearing out.

Further, the rotating handle can be locked at the valve-close position by the manual valve equipped with the lock mechanism. Thus, even when a raw material having hazardous properties such as toxicity and flammability is accommodated inside, locking is reliably made in a valve-close state at the time of non-use such as delivery or storage. Accordingly, the rotating handle can be prevented from being loosened when not necessary by unintentional handle operation by unwanted external forces such as vibration and impact, erroneous operation, or the like, thereby preventing leakage of the raw material.

DETAILED DESCRIPTION OF EMBODIMENTS OF THE INVENTION

Figure 1:
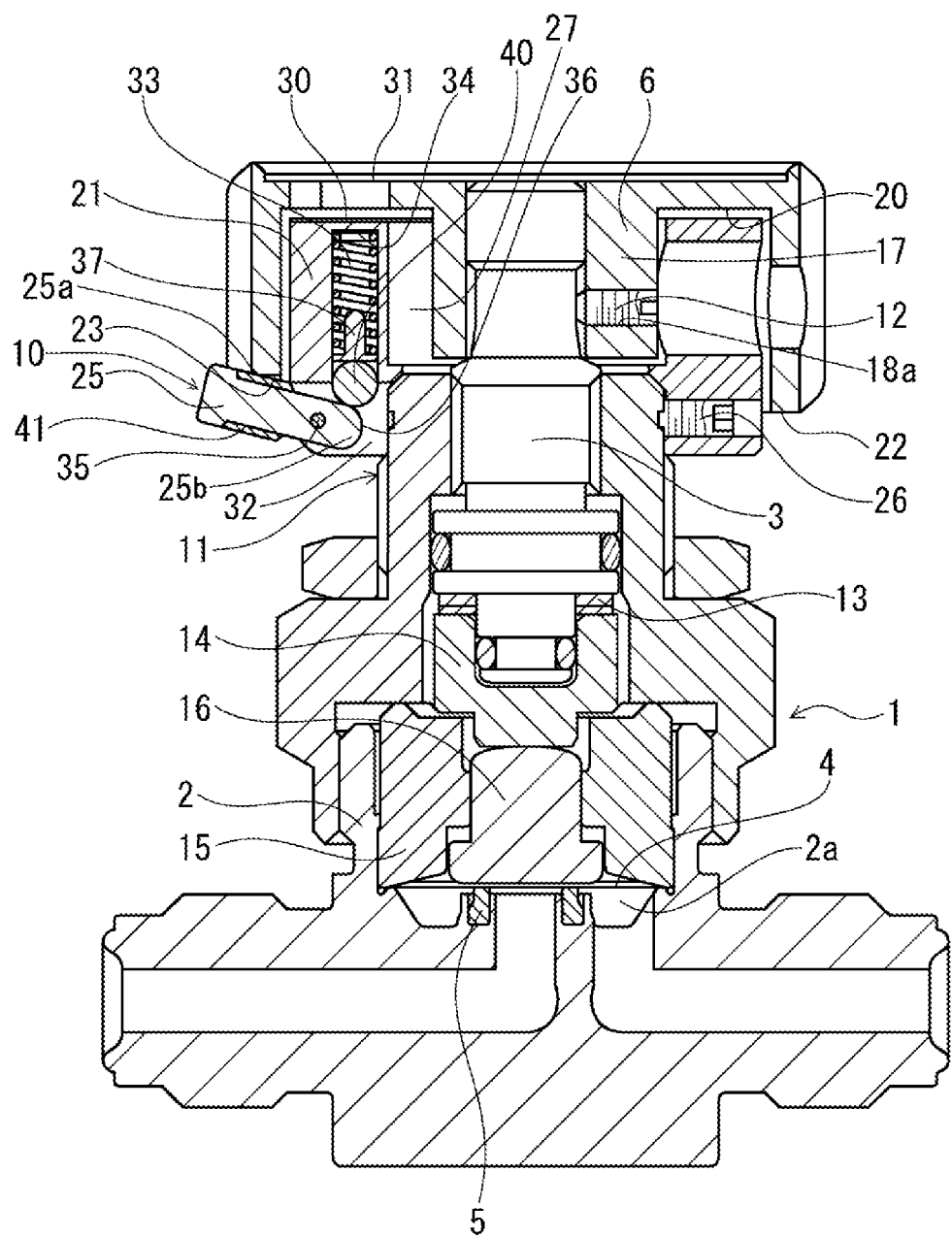
FIG. 1 is a longitudinal sectional view depicting a valve-close state of an embodiment of a one-touch lock valve of the present invention.
Figure 3:
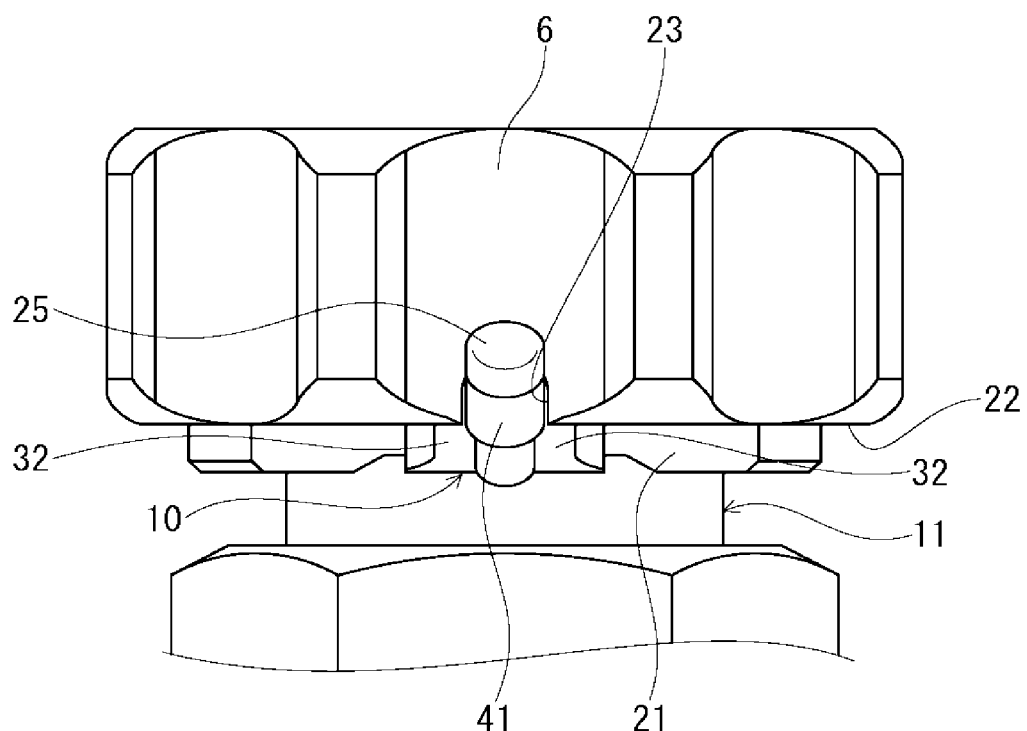
FIG. 3 is a partial front view of FIG. 1.
Figure 4:
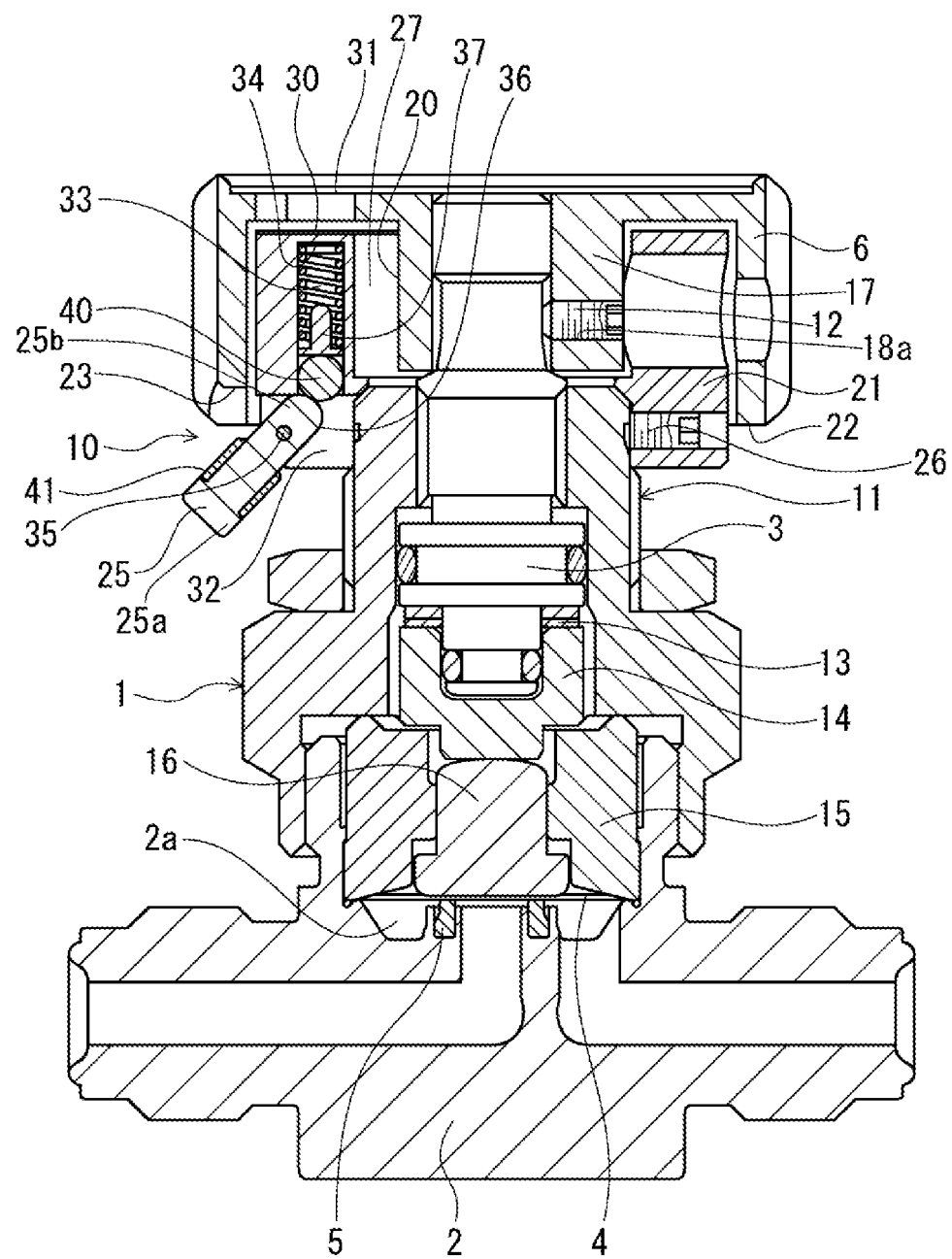
FIG. 4 is a longitudinal sectional view depicting an unlocked state of FIG. 1.
Figure 5:
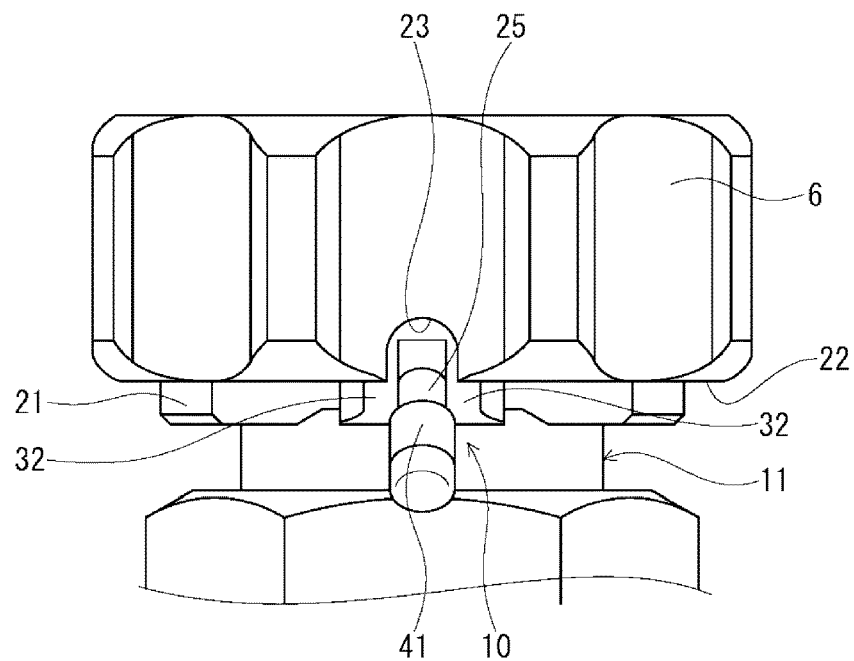
FIG. 5 is a partial front view of FIG. 4.

In the following, embodiments of the one-touch lock valve and the raw material container in the present invention are described in detail based on the drawings. In FIG. 1 and FIG. 3, depicted is a valve-close state of an embodiment of the one-touch lock valve of the present invention. In FIG. 4 and FIG. 5, depicted is a state in which the one-touch lock valve is unlocked.

In the drawings, a one-touch lock valve (hereinafter referred to as a valve main body 1) has a body 2, a stem 3, a diaphragm 4 as a valve body, a valve seat 5 for sealing, a rotating handle 6, a lock mechanism 10, and a holder 21.

The valve main body 1 is formed of a diaphragm valve. Inside the body 2 of this valve main body 1, the diaphragm 4 is incorporated. This body 2 is provided with an axial mounting part 11 with the stem 3 axially mounted in a screwed-in state.

To an upper part of the stem 3, the rotating handle 6 is integrally attached by spline coupling, and the rotating handle 6 is fastened by a set screw 12 with a hexagon socket to prevent the handle from coming off. The stem 3 is provided so as to be able to move up or down with the stem 3 rotating integrally with the rotating handle 6 by rotation of the rotating handle 6. On a lower side of the stem 3, a stem cap 14 is mounted via a disc spring 13.

The diaphragm 4 is attached to the body 2 in a state in which its periphery is pressurized by a diaphragm retainer 15 provided in a substantially cylindrical shape onto an annular portion of a flow path 2a in the body. At the center of the diaphragm retainer 15, a diaphragm piece 16 is mounted in a state of being guided so as to be able to move up and down. The diaphragm piece 16 is arranged on a lower part of the stem cap 14, and is provided so as to be able to be pressurized to a side of the valve seat 5 by the stem cap 14 pressed downward by a spring force of the disc spring 13. The valve seat 5 is mounted on a side of the flow path 2a in the body opposed to the diaphragm 4.

With the above-described structure, when the stem 3 provided to the valve main body 1 is rotated by the rotating handle 6, the stem 3 moves up or down in the body 2 by rotation of the rotating handle 6, the stem cap 14 and the diaphragm piece 16 move up or down with the stem 3, and the diaphragm piece 16 pressurizes or depressurizes the diaphragm 4. With this arrangement, the diaphragm 4 can move into contact with or move away from the valve seat 5 to allow the flow path 2a in the body to be opened and closed.

The rotating handle 6 is made of, for example, a metal material such as an aluminum alloy, and its surface has a coating with an appropriate color. On an inner peripheral side of the rotating handle 6, an annular groove part 20 is formed. The holder 21 has a substantially cylindrical shape and is insertable into the annular groove part.

Figure 2A:
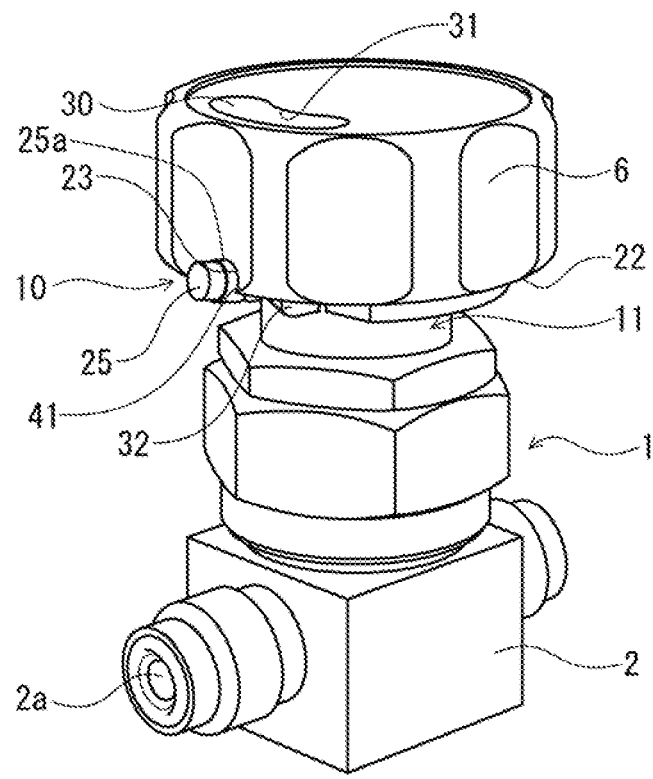
In FIG. 2A is an upper perspective view of the one-touch lock valve of FIG. 1.
Figure 2B:
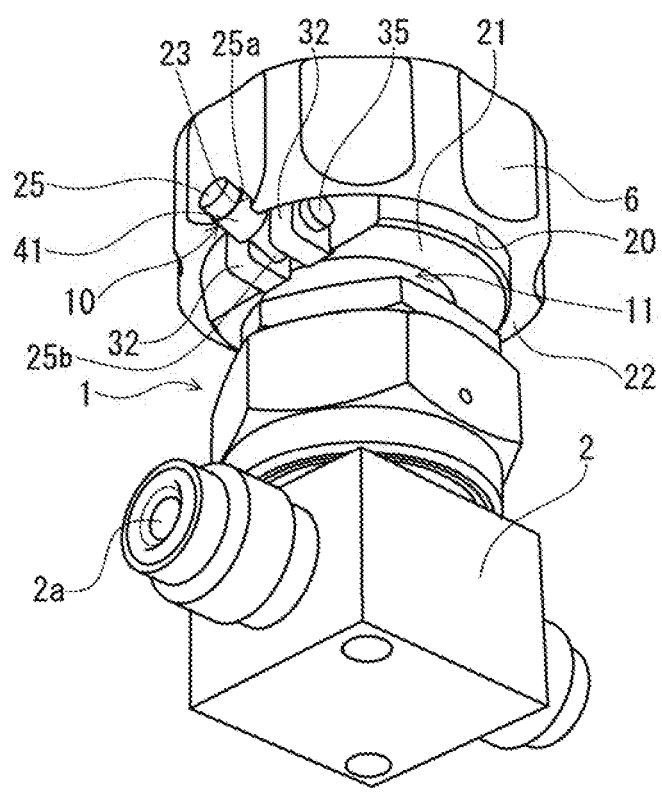
FIG. 2B is a lower perspective view of the one-touch lock valve of FIG. 1.

As depicted in FIG. 3 and FIG. 5, a lower part of the rotating handle 6 is provided with an arc-shaped lower edge part 22, which is partially notched into a substantially arc shape with a predetermined size to form an engagement groove 23. As depicted in FIG. 2A and FIG. 2B, in the engagement groove 23, a tip part side of a lock member 25, which will be described further below, is locked into the rotating handle 6. In the locked state of FIG. 2A, the lock member 25 is not removed when the rotating handle 6 is tried to be rotated. On the other hand, the engagement groove 23 is desirably provided so as to have a width and depth so that the lock member 25 can be manually removed with ease.

Figure 6:
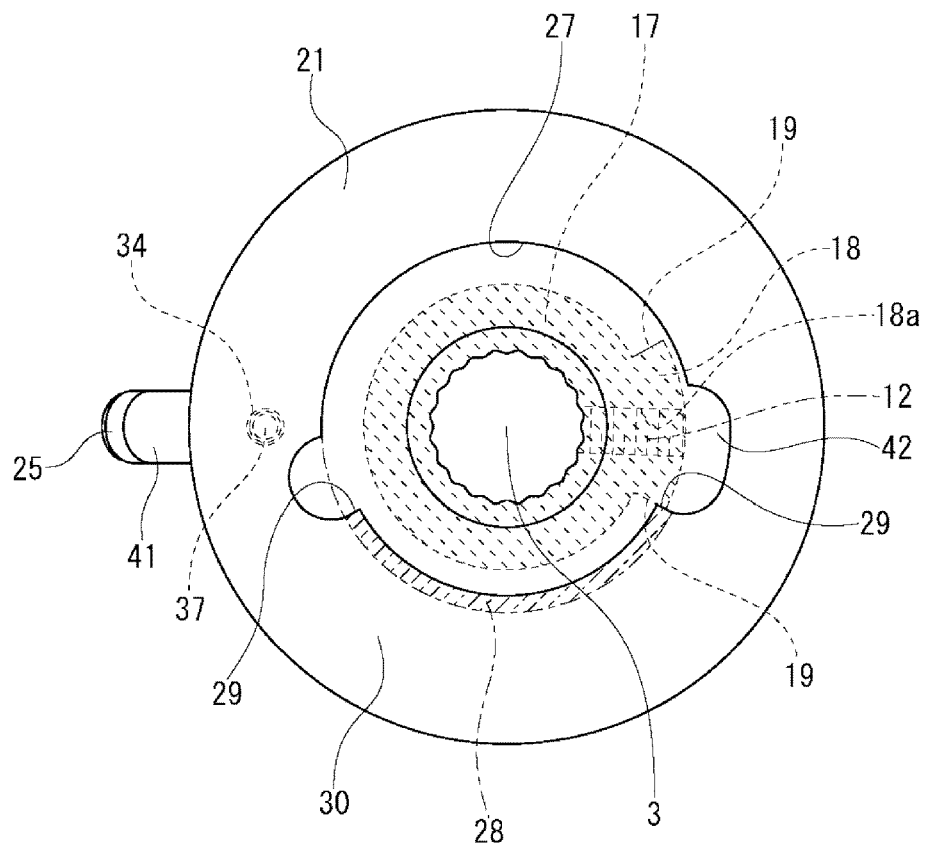
FIG. 6 is an enlarged plan view depicting a state with a rotating handle of FIG. 5 removed.

As shown in FIG. 6, a projection part 17 (indicated by broken lines) is formed at the center of the rotating handle 6 toward a side of mounting on the holder 21. On an outer diameter side of the projection part 17, a protruding part 18 partially protruding in a substantially fan shape is formed. On rotation sides (sides in the rotary directions) of the protruding part 18, lock surfaces 19, 19 are provided. On the protruding part 18, a female screw (thread) 18a for attachment of the set screw 12 by screwing is formed in a radial direction.

The holder 21 depicted in FIG. 1 and FIG. 6 is formed in a substantially cylindrical shape and, in a state of being provided so as to be able to be accommodated inside the rotating handle 6, is fixed to an upper part of the axial mounting part 11 by a set screw 26 with a hexagon socket. At the center of the holder 21, an attachment hole part 27 is provided for attachment to the rotating handle 6 and restricting the rotation of the rotating handle 6. Via the attachment hole part 27, the rotating handle 6 is attached. With this structure, the rotating handle 6 is configured to relatively rotate with respect to the holder 21, together with the stem 3.

As indicated by one-dot-chain lines of FIG. 6, a restricting part 28 protruding in an inner diameter direction is formed in the attachment hole part 27. On a side face opposed to a lock surface 19 in the restricting part 28, a restriction surface 29 is provided, to which the lock surface 19 can be locked at the time of rotation of the rotating handle 6. In the present example, the lengths of the above-described protruding part 18 and restricting part 28 in a circumferential direction are set so that the rotation angle of the rotating handle 6 from a valve-close to a full-open state is in a range of 180 degrees. The open/close angle of the rotating handle 6 can be freely changed by setting sizes of the protruding part 18 and the restricting part 28 in the circumferential direction in accordance with the type and specifications of a valve.

At a portion of the attachment hole part 27 on an attachment side of the set screw 12 near a boundary with the restricting part 28, a groove-shaped cavity part 42 is formed on an outer diameter side of the attachment hole part 27. By providing the cavity part 42, when the rotating handle 6 is attached or removed, the rotating handle 6 is rotated so that the set screw 12 is at the position of the cavity part 42, and then the set screw 12 is loosened so as to escape to a side of the cavity part 42, thereby releasing fastening of the set screw 12 into the stem 3 without contacting the inner wall of the attachment hole part 27. In this state, the rotating handle 6 can be removed by being pulled upward from the holder 21.

As depicted in FIG. 2A, an upper surface of the holder 21 is provided with an arc-shaped display part 30 indicating any of full-open, full-close, and an intermediate degree of opening of the valve main body 1. On the other hand, the rotating handle 6 opposed to the display part 30 is partially provided with a visual recognition window 31. With this, when the rotating handle 6 is rotated, the display part 30 can be visually recognized from outside through the visual recognition window 31, allowing the degree of opening of the rotating handle 6 to be checked. At the time of valve opening/closing by the rotating handle 6, the lock surfaces 19, 19 described above abut on restriction surfaces 29, 29 to restrict an open/close position, and an open/close state at this time is presented via the display part 30.

As depicted in FIG. 2B, a bottom surface side of the holder 21 is provided with two protrusion pieces 32, 32 with a predetermined space. Between these protrusion pieces 32, a portion of the lock member 25 on a rear end side is axially mounted, as will be described further below. Also, in FIG. 1, in the holder 21, a hole part 34 for attaching a spring 33, which will be described further below, is formed in an orientation substantially parallel to the rotation axis of the rotating handle 6.

In FIG. 1 and FIG. 4, the lock mechanism 10 is arranged between the holder 21 and the rotating handle 6, and is formed of a lock member 25, the engagement groove 23, the spring 33, a spring receiver 37, and a spherical body 40 formed of a steel ball.

The lock member 25 is formed of, for example, a lock pin formed of a metal material such as stainless steel in a substantially lever shape that is manually operable, is inserted between the above-described two protrusion pieces 32, 32 of the holder 21, and the rear end side thereof is axially mounted on the protrusion pieces 32 by a set pin 35. With this, the lock pin 25 is provided so as to be able to be rotationally operated about the set pin 35. At a rear end part of the lock pin 25, a hemispherical part 36 is formed, and the hemispherical part 36 is provided so as to be able to be pressurized by the spherical body 40, which will be described further below.

A tip of the lock pin 25 is provided in a state of protruding to some extent outward from a side of the rotating handle 6 and, when coming to the position of the engagement groove 23, can be engaged in the engagement groove 23. With this, the one-touch lock valve of the present invention has the lock mechanism 10 while maintaining compactness, with its outer appearance hardly changed from that of a conventional valve without having the lock mechanism.

The spring 33 is formed of a coil spring, is provided so as to be insertable into the hole part 34 of the holder 21 from below the holder 21, and is arranged so as to bias the spherical body 40 downward. On a downward side of the spring 33, the spring receiver 37 is attached. Via the spring receiver 37, the spherical body 40 is provided. With this structure, the spherical body 40 is pressed by the spring 33 via the spring receiver 37 attached below the spring 33. In a state in which the hemispherical part 36 of the lock pin 25 is engaged via the spherical body 40, the lock pin 25 is provided so as to rotate about the set pin 35 and be able to abut on the lower edge part 22 of the rotating handle 6 in a state of being pressed by the spring force of the spring 33.

At a position on a side of the lock pin 25 abutting on the lower edge part 22 of the rotating handle 6, a collar 41 is attached. The collar 41 is molded out of, for example, a resin material such as nylon. The collar 41 is configured to make contact with the lower edge part 22 of the rotating handle 6 when the lock pin 25 rotates to a side of the rotating handle 6.

The collar 41 is provided to rotate about the axis of the lock pin 25 with rotation of the rotating handle 6 or to be in a state of being fixed to the lock pin 25, when abutting on the lower edge part 22 of the rotating handle 6.

With these structures, the lock pin 25 is always pressed by the lock mechanism 10 to the side of the rotating handle 6. In a valve-close state depicted in FIG. 1 and FIG. 3, in a state in which the lock pin 25 is at a position opposed to the engagement groove 23, the lock pin 25 is automatically locked in a state of being pressed by the spring 33 into the engagement groove 23.

On the other hand, when the rotating handle 6 is operated, as depicted in FIG. 4 and FIG. 5, the lock pin 25 pressed by the spring 33 is pushed downward by a user's finger against that force to be removed from the engagement groove 23, thereby bringing about an unlocked state. In this state, the rotating handle 6 is rotated to a position where the engagement groove 23 is deviated from the lock pin 25, thereby bringing about a state in which this lock pin 25 abuts on the lower edge part 22 of the rotating handle 6 when pressurization of the lock pin 25 is released.

In this state, the rotating handle 6 can be rotated. At the time of the rotating operation, in a state in which the lower edge part 22 of the rotating handle 6 is in contact with the lock pin 25, operation to any degree of valve opening can be made. The lock pin 25 at this time is caused to abut on the lower edge part 22 in a state of being pressed by the biasing force of the spring 33, and the rotating handle 6 can smoothly rotate in any direction.

Also, in the present embodiment, when the rotating handle 6 is rotated to a valve closing direction to cause the valve to become in a closed state and cause the lock pin 25 to be at the position opposed to the engagement groove 23, the lock pin 25 is pressed by the spring force into the engagement groove 23 to be automatically locked. Here, the rotating handle 6 maintains the state of being locked unless the lock pin 25 is manually removed from the engagement groove 23.

The attachment position of the rotating handle 6 to the stem 3 (the rotating state of the rotating handle 6 with respect to the stem 3) is provided so as to be adjustable by the set screw 12. At a valve-close position of the rotating handle 6, the lock pin 25 is locked in the engagement groove 23, causing the full-closed state of the rotating handle 6 to be locked.

The above-described valve main body 1 can be connected to, for example, a raw material container (hereinafter referred to as a container main body 50) depicted in FIG. 7. The container main body 50 is formed of a material that can accommodate therein a raw material not depicted having properties such as toxicity and flammability. Two locations on an upper surface 51 of the container main body 50 are provided with flow paths 52 and 53 for internal suction and emission, respectively. To each of the flow paths 52 and 53, a manual valve equipped with a lock mechanism having the valve main body 1 is attached, and is provided so that each of the flow paths 52 and 53 can be opened and closed by operation of the valve main body 1. Here, the rotating handle 6 is provided so as to be able to be locked at a valve-close position by the lock mechanism 10, preventing opening/closing operation of the valve main body 1 when not necessary.

In the above-described embodiment, a diaphragm valve is taken as the valve main body 1. However, the lock mechanism 10 can be provided also to any of various valve main bodies except the diaphragm valve that are manual valves which are opened and closed by the rotating handle 6. In that case, this can also support cases with varied rotation angles from valve-close to a full-open state of the rotating handle.

The lock member 25 is not limited to the lock pin, any can be applied, without limitation, that is pressed by spring-back to the side of the rotating handle 6 and can be locked in the engagement groove 23 of the rotating handle 6.

To press the lock pin 25 toward the lower edge part 22 of the rotating handle 6, the coil spring 33 (and the spring receiver 37) and the spherical body 40 are used. However, as long as the structure is such that the lock pin 25 on the side of the valve main body 1 can be engaged and locked in the engagement groove 23, a spring other than the coil spring 33 can be used, or the lock pin 25 can be pressed by spring forces of other various structures.

In the case of the present embodiment, the lock pin 25 operates by leverage. Thus, by changing the axial mounting position (the position of the set pin 35), which is the fulcrum of the lock pin 25, a distance from this fulcrum to the point of effort, which is the operating position of the lock pin 25, changing a distance from the fulcrum to a contact surface with the spherical body 40, which is the point of load, or changing a spring-back coefficient of the coil spring 33, it is also possible to adjust an engaging force of the lock pin 25 in the engagement groove 23 (a pressing-down force required at the time of lock releasing).

Also, the lock pin 25 in a valve-close state is automatically locked in the engagement groove 23. However, by providing the engagement groove 23 at a valve-open position, the lock pin 25 can be automatically locked in the engagement groove 23 in a valve-open state. Alternatively, by providing engagement grooves 23 at both positions in the valve-close and valve-open states, an automatic lock can be made at both of the open/close positions.

Next, the operation in the above-described embodiment of the one-touch lock valve in the present invention is described.

In the valve main body 1 in the present invention, at the time of valve closing, as depicted in FIG. 1, the lock pin 25 always pressed by the spring 33 is engaged in the engagement groove 23 of the rotating handle 6 to maintain a locked state. Thus, even if an unintentional rotation force is applied to the container main body 50 with the valve main body 1 of FIG. 7 connected thereto, such as in cases in which an inadvertent external force such as vibration and impact acts at the time of delivery or the like or an unwillful operating force such as erroneous operation acts, the rotation of the rotating handle 6 can be reliably inhibited. In this manner, the valve-close state can be reliably maintained, and leakage of the raw material in the container main body 50 can be prevented.

At the time of valve-opening operation of the rotating handle 6, the lock pin 25 is rotated to a valve-open direction while being pushed down by a finger. This can easily release the locked state by the lock pin 25. Here, in a state in which the spherical body 40 is pressed by the spring 33 via the spring receiver 37 to cause the hemispherical part 36 of the lock pin 25 to be engaged via this spherical body 40, the lock pin 25 is pressed by the force of the spring toward the lower edge part 22 of the rotating handle 6, thereby allowing the lock pin 25 to be pushed down by leverage with a lighter pressurizing force. Furthermore, with the hemispherical part 36 and the spherical body 40 making a point contact, the lock pin 25 can be smoothly operated with a less resistance force.

During a rotating operation of the rotating handle 6, the lower edge part 22 makes contact with the lock pin 25. Furthermore, by leverage described above, the force applied from the lock pin 25 to the rotating-handle lower edge part 22 is decreased. Thus, mutual sliding resistance is decreased to minimum, and easy operation can be made with a light force.

Furthermore, the collar 41 is attached to the position of contact with the rotating-handle lower edge part 22 on the lock pin 25. Thus, the collar 41 can rotate about the axis of the lock pin 25 in accordance with the operation of the rotating-handle lower edge part 22 and can slide with respect to the rotating-handle lower edge part 22. With this, sliding resistance can be further reduced. Furthermore, if the collar 41 is rotatably attached, the rotating handle 6 can be operated with a lighter force. Also, compared with the case of sliding, wear and tear of the rotating handle 6 and the lock pin 25 can also be prevented. Furthermore, since the collar 41 is made of resin, a direct contact of the metal-made lock pin 25 with the rotating handle 6 is prevented, and exfoliation and wear of the coating on the surface of the rotating handle 6 are reduced.

When the rotating handle 6 is operated in a close direction to bring about a valve-close state, the lock pin 25 is moved to a position opposed to the engagement groove 23 and, with the lock pin 25 being pressed by the spring 33, the lock pin 25 is automatically locked in the engagement groove 23. In this manner, by adjusting the mounting position of the rotating handle 6, locking at the valve-close state can be reliably performed without performing a locking operation at the time of valve closing.

With an automatic lock in a valve-close state by the above-structured lock mechanism 10, the lock mechanism 10 does not cause an obstruction at the time of operation of the rotating handle 6. Since a simple mechanism is provided with a small number of components, assembling is easy, and this also contributes to compactness of the entire valve main body 1.

Figure 7:
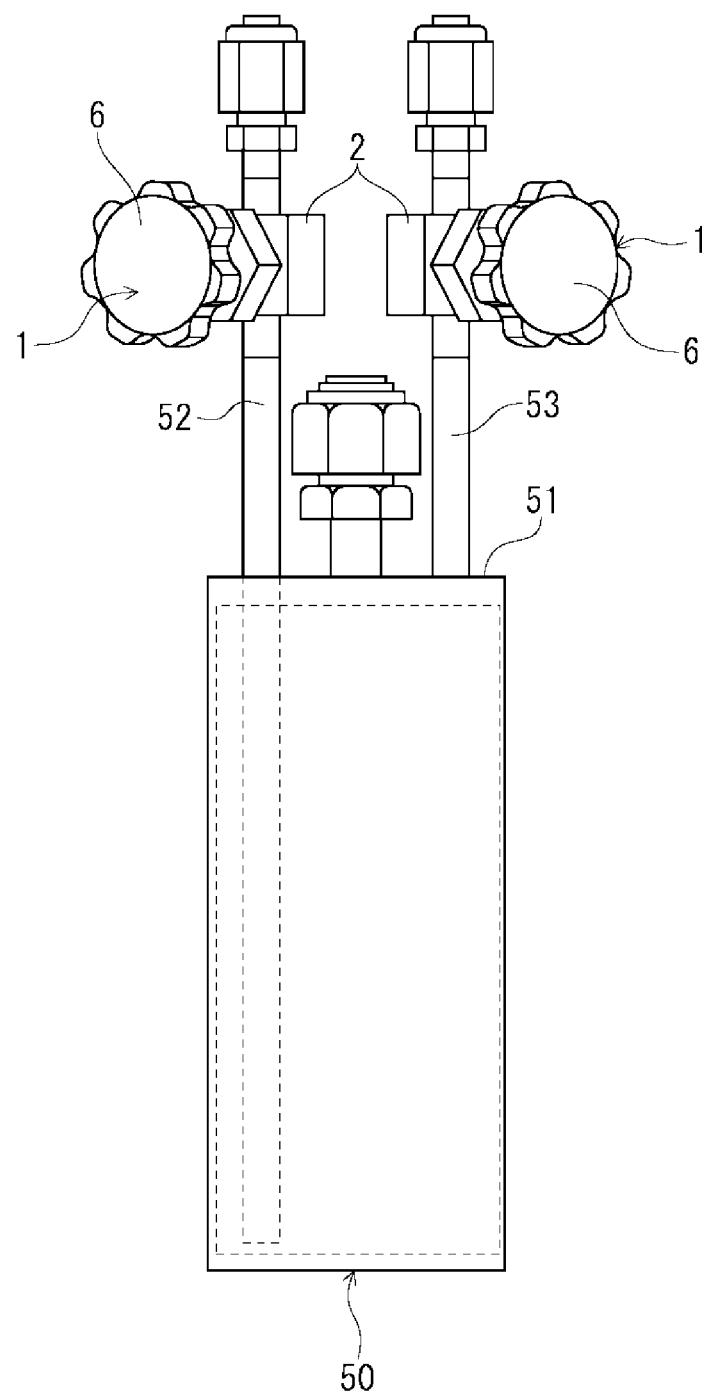
FIG. 7 is a front view depicting a raw material container.

From this, as depicted in FIG. 7, even when the projected area of the container main body 50 in a mounting direction is small and the space between the flow paths 52 and 53 for suction and emission is narrow, the valve main body 1 can be connected to these flow paths 52 and 53. Furthermore, since the lock mechanism 10 hardly protrudes to the outside of the valve main body 1, the footprint of the container main body 50 is ensured, and the container main body 50 having the valve main body 1 connected thereto can be installed even in a narrow place.

The lock mechanism 10 in the one-touch lock valve of the present invention is configured by fixing the holder 21 to the upper part of the axial mounting part 11 of the valve main body 1 and applying the rotating handle 6 provided with the engagement groove 23. Therefore, for example, with commonality of structures other than the handle and the holder being provided in advance, even if the lock mechanism is initially not required but becomes required to be provided later, the holder 21 is attached to the axial mounting part of the valve and replacement is made by the rotating handle 6 having the engagement groove 23, thereby allowing the lock mechanism to be retrofitted.

In FIG. 8 to FIG. 11, depicted is another embodiment of the one-touch lock valve of the present invention. In this embodiment, a portion identical to that of the above-described embodiment is indicated by the same reference character and its description is omitted.

In a valve main body 60 in this embodiment, a check rod 62 of an appropriate length is integrally provided to extend to an upper side of a spring receiver 61. On the other hand, in the display part 30 of the holder 21, a through hole 63 is bored, where an upper end 62a of the check rod 62 can move up into an exposed state. With this, at the time of rotating operation of the lock pin 25, the check rod 62 (spring receiver 61) moves up or down in the through hole 63 via the spherical body 40 by leverage, and the exposed state of the check rod 62 from the through hole 63 can be visually recognized. In this manner, the operation state of the lock pin 25 can be easily checked from above the valve main body 1 via the through hole 63.

Also, with the upper end 62a of the check rod 62 exposed in the display part 30, an unlocked state or a locked state of the rotating handle 6 can be visually recognized from outside.

Figure 8:
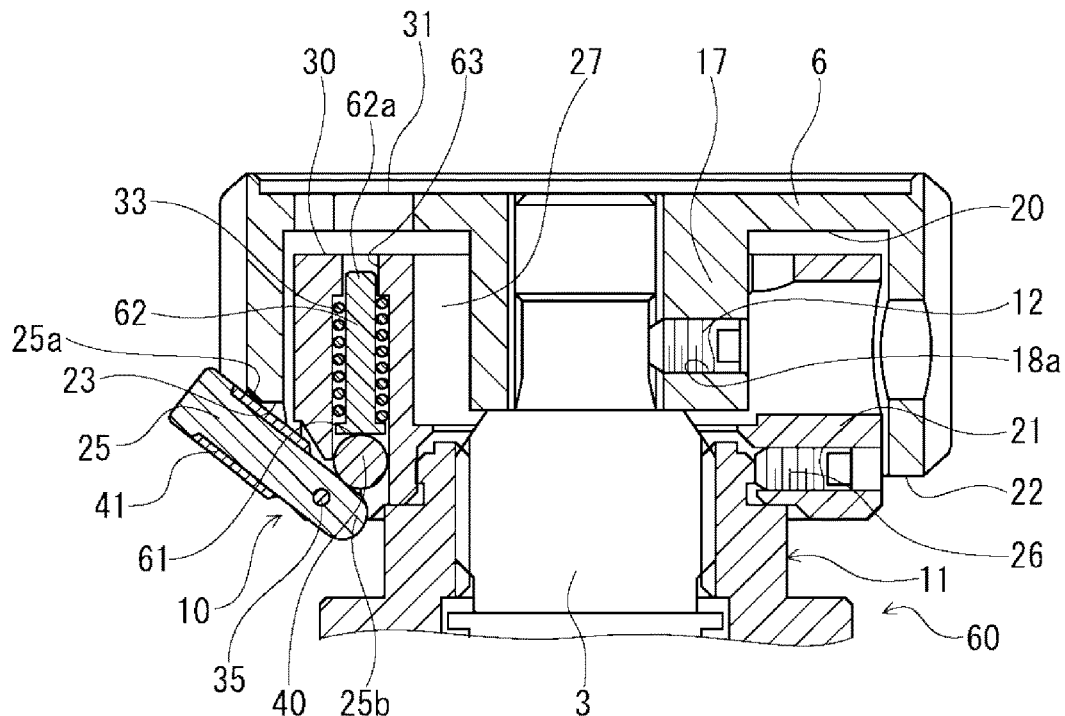
FIG. 8 is a partial longitudinal sectional view depicting a valve-close state of another embodiment of the one-touch lock valve of the present invention.
Figure 9:
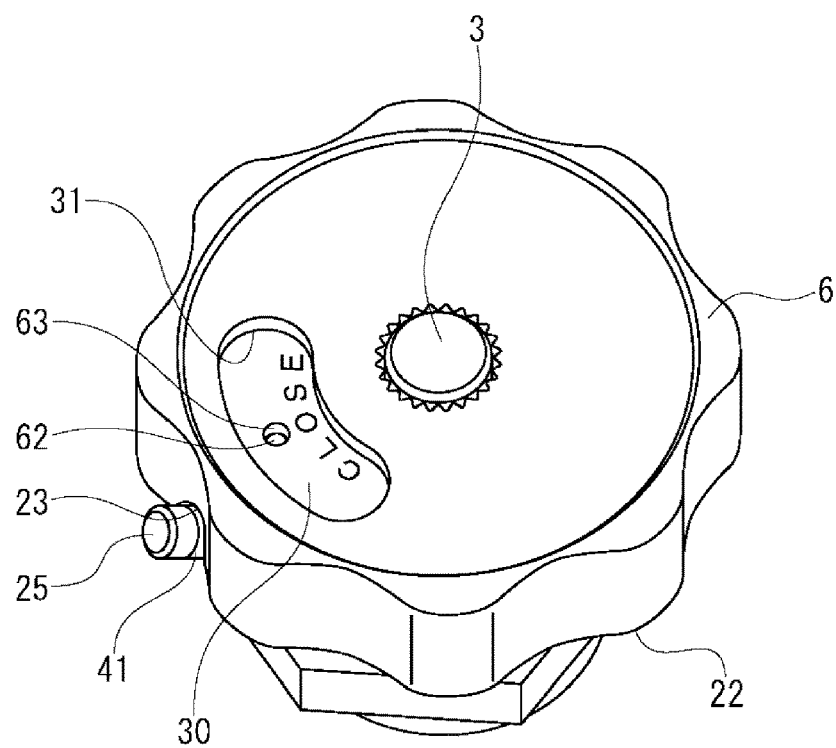
FIG. 9 is an upper perspective view of FIG. 8.

FIG. 8 and FIG. 9 depict a valve-close state of the valve main body 60. In this case, with the check rod 62 moving down, its upper end 62a becomes in a state of sinking more than the display part 30, allowing it to be visually recognized from above that the rotating handle 6 is in a locked state.

Figure 10:
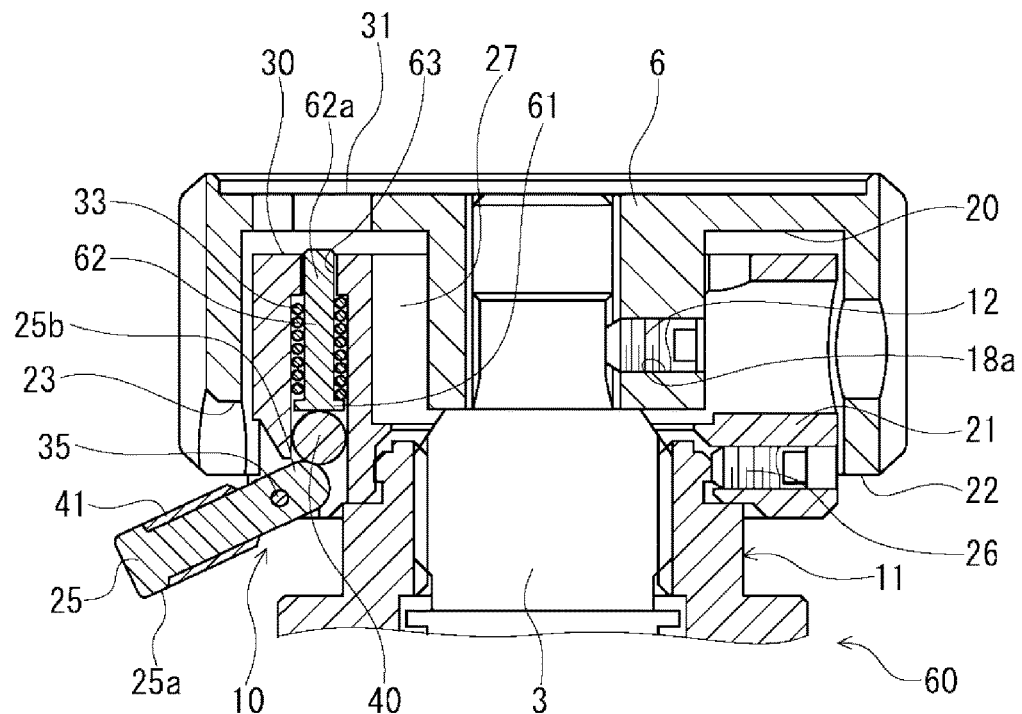
FIG. 10 is a longitudinal sectional view depicting an unlocked state of FIG. 8.
Figure 11:
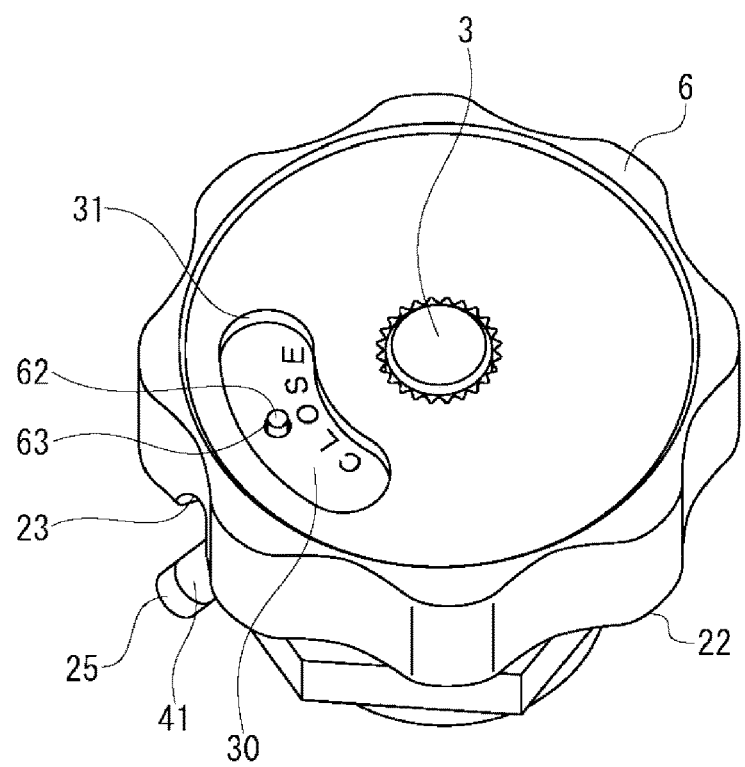
FIG. 11 is an upper perspective view of FIG. 10.

On the other hand, FIG. 10 and FIG. 11 depict a state in which a tip part 25a of the lock pin 25 is pushed downward for unlocking. In this case, the check rod 62 moves up to cause its tip 62a to become in a state of protruding more than the display part 30, allowing it to be visually recognized from above that the rotating handle 6 is in a locked state.

From these, for example, even when a container main body not depicted is installed in a narrow place and it is difficult to check the rotation state of the lock pin 25 of the valve main body 60 attached to this container main body, the locked state or unlocked state of the rotating handle 6 can be easily grasped by external visual recognition of the display part 30, and the valve main body 60 can be reliably closed and prevented from being erroneously operated.

In the valve main body 60 of the above-described embodiments, a mechanism is provided so that the check rod 62 (spring receiver 61) moves down when the rotating handle 6 is in a locked state and the check rod 62 moves up when it is in an unlocked state. By contrast with this, a mechanism may be provided in which the check rod 62 moves up when it is in a locked state and the check rod 62 moves down when it is in an unlocked state. In this case, with the upper end 62a of the check rod 62 protruding from the display part 30 at the time of locking, this state can be visually recognized from outside with more ease, the close state of the valve main body 60 can be reliably grasped to prevent leakage of raw material from a raw material container and so forth.

Although not depicted, an upper end outer peripheral side of the check rod 62 may be colored. In this case, the colored portion at the upper end protrudes more than the display part 30 when the check rod 62 moves up, the moving-up state of the check rod can be visually recognized with more ease.

The present invention is not limited to the description of the embodiments described above, and can be variously changed in a range not deviating from the gist of the invention described in the claims of the present invention.

REFERENCE SIGNS LIST

1, 60 valve main body
3 stem
6 rotating handle
10 lock mechanism
11 axial mounting part
21 holder
22 lower edge part
23 engagement groove
25 lock pin (lock member)
25a tip part
25b rear end par
30 display part
31 visual recognition window
33 coil spring (spring)
36 hemispherical part
37, 61 spring receiver
40 spherical body
41 collar
50 container main body
62 check rod
62a upper end
63 through hole

The invention claimed is:

1. A one-touch lock valve comprising:
   a valve main body having a valve body incorporated therein;
   a stem axially mounted on the valve main body;
   a rotating handle fixedly attached to an upper part of the stem;
   a holder accommodated inside of the rotating handle and fixed to an axial mounting part of the valve main body; and
   a lock mechanism arranged in the holder and the rotating handle, wherein the lock mechanism includes:
      a spring inserted into the holder;
      a spherical body provided on a lower side of the spring;
      a lock member having a rear end side attached to the holder, a part of the rear end side pressed by the spring via the spherical body, a tip part biased by the spring into abutment with a lower edge part of the rotating handle, and an engagement groove formed on the lower edge part of the rotating handle where the tip part of the lock member can engage the engagement groove to lock the rotating handle, and wherein the rotating handle is automatically locked when the lock member is at a position aligned with the engagement groove and the tip part of the lock member is engaged in the engagement groove by being biased by the spring into the engagement groove.

2. The one-touch lock valve according to claim 1, wherein the spherical body is pressed by the spring via a spring receiver attached below the spring, the lock member is pressed by the spring toward the lower edge part of the rotating handle in a state in which a hemispherical part formed at the rear end part of the lock member is engaged via the spherical body, and the tip part of the lock member is caused to protrude to some extent from a sideward direction of the rotating handle.

3. The one-touch lock valve according to claim 2, wherein the lock member is locked in the engagement groove at a valve-close position of the rotating handle.

4. The one-touch lock valve according to claim 2, wherein a display part for full-open and full-close is provided on an upper surface of the holder, and the display part is provided so as to be visually recognizable from a visual recognition window provided on the rotating handle.

5. The one-touch lock valve according to claim 4, wherein a check rod is provided to integrally extend from an upper side of the spring receiver, and a through hole is provided as a bore in the display part of the holder so that an upper end of the check rod can move up into an exposed state.

6. The one-touch lock valve according to claim 5, wherein the upper end of the check rod is exposed to the display part to allow an unlocked state or a locked state of the rotating handle to be visually recognized from outside of the valve.

7. The one-touch lock valve according to claim 2, wherein a collar is attached to the lock member at a position to be in contact with the lower edge part of the rotating handle.

8. A raw material container provided with the one-touch lock valve according to claim 2 in which the rotating handle is able to be locked at a valve close position.

9. The one-touch lock valve according to claim 1, wherein the lock member is locked in the engagement groove of the rotating handle to lock the rotating handle in a fully closed position of the valve.

10. The one-touch lock valve according to claim 9, wherein a display part for full-open and full-close is provided on an upper surface of the holder, and the display part is provided so as to be visually recognizable from a visual recognition window provided on the rotating handle.

11. The one-touch lock valve according to claim 10, wherein a check rod is provided to integrally extend from an upper side of a spring receiver attached below the spring, and a through hole is provided as a bore in the display part of the holder so that an upper end of the check rod can move up into an exposed state.

12. The one-touch lock valve according to claim 11, wherein the upper end of the check rod is exposed to the display part to allow an unlocked state or a locked state of the rotating handle to be visually recognized from outside of the valve.

13. The one-touch lock valve according to claim 9, wherein a collar is attached to the lock member at a position to be in contact with the lower edge part of the rotating handle.

14. A raw material container provided with the one-touch lock valve according to claim 9 in which the rotating handle is able to be locked at the closed position of the valve.

15. The one-touch lock valve according to claim 1, wherein a display part for full-open and full-close is provided on an upper surface of the holder, and the display part is provided so as to be visually recognizable from a visual recognition window provided on the rotating handle.

16. The one-touch lock valve according to claim 15, wherein a check rod is provided to integrally extend from an upper side of a spring receiver attached below the spring, and a through hole is provided as a bore in the display part of the holder so that an upper end of the check rod can move up in an exposed state.

17. The one-touch lock valve according to claim 16, wherein the upper end of the check rod is exposed to the display part to allow an unlocked state or a locked state of the rotating handle to be visually recognized from outside of the valve.

18. The one-touch lock valve according to claim 15, wherein a collar is attached to the lock member at a position to be in contact with the lower edge part of the rotating handle.

19. The one-touch lock valve according to claim 1, wherein a collar is attached to the lock member at a position to be in contact with the lower edge part of the rotating handle.

20. A raw material container provided with the one-touch lock valve according to claim 1 in which the rotating handle is able to be locked at a valve close position.

* * * * *